Aug. 9, 1932.    H. BERMAN    1,870,983
BABY CARRIAGE
Filed May 31, 1930
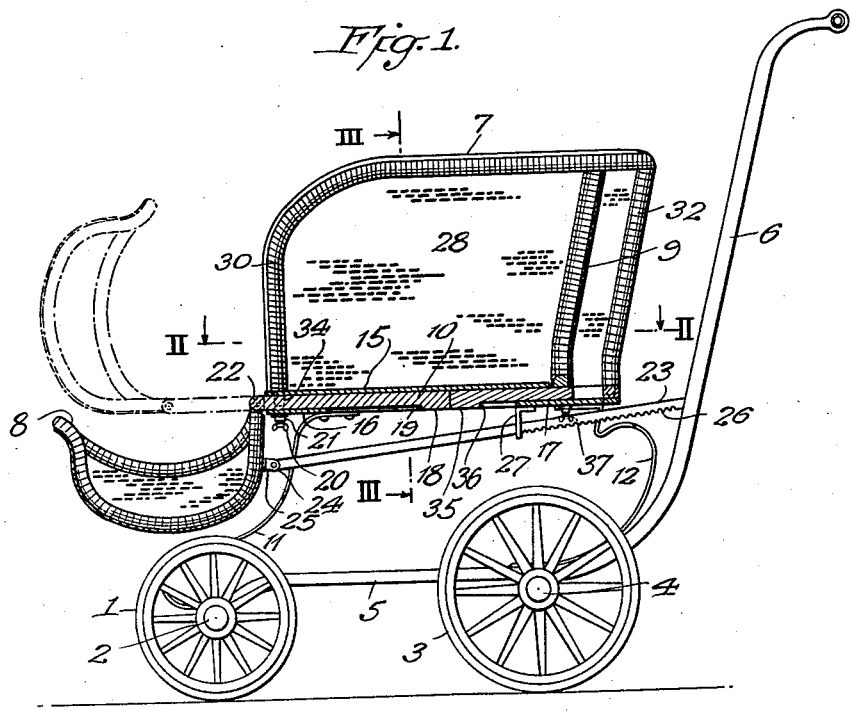
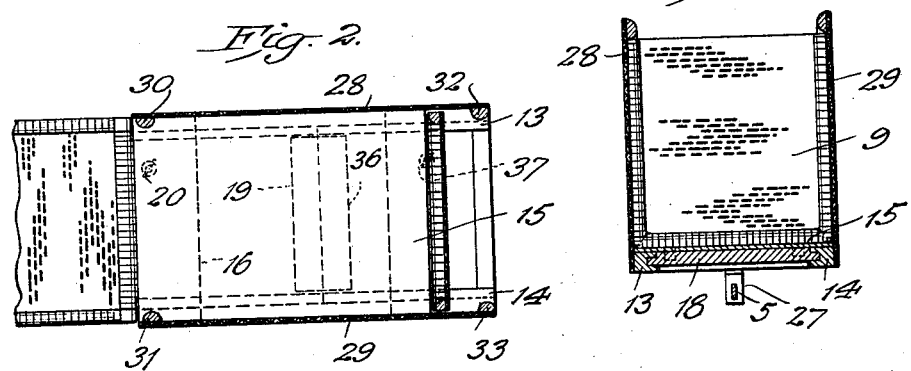
INVENTOR
HARRY BERMAN.
BY
Lyman E. Dodge
ATTORNEY Patented Aug. 9, 1932

1,870,983

UNITED STATES PATENT OFFICE

HARRY BERMAN, OF BROOKLYN, NEW YORK

BABY CARRIAGE

Application filed May 31, 1930. Serial No. 458,050.

This invention relates to a vehicle, particularly to that kind of vehicle known, generally, as a baby carriage and more especially to baby carriages of the type sometimes known as strollers.

Baby carriages of the stroller type may be of ample dimensions for a child sitting or reclining when the child is small, and may be of ample dimensions for a child sitting when the child becomes larger, but may not be of a sufficient length for the larger size child while reclining.

A principal object of this invention is the provision of a construction such that a baby carriage, especially of the stroller type, may be so adjusted, or expanded, so to speak, as a child grows so that it will be of ample dimensions for the child while reclining.

Other objects and advantages will appear as the description of a particular physical embodiment selected to illustrate the invention progresses and the novel features will be particularly pointed out in the appended claims.

In describing the particular physical embodiment selected to illustrate the invention, reference will be had to the accompanying drawing and the several views thereon, in which like parts will be designated by like characters throughout the several views, and in which:

Figure 1 is a side elevational view, partly in section, of an ordinary type of baby carriage embodying the invention; Fig. 2 is a cross-sectional view of the device as shown in Fig. 1, on the plane indicated by the line II—II, viewed in the direction of the arrows at the ends of the line; Fig. 3 is a cross-sectional view of the device, shown in Fig. 1, on the plane indicated by the line III—III, viewed in the direction of the arrows at the ends of the line.

The baby carriage, considered generally, is substantially like ordinary and well known baby carriages of the stroller type. It includes two forward wheels, as 1, supported one at each end of an axle, 2; two rear wheels, as 3, supported by an axle as 4; two perches or rods as 5 serving to connect and act as distance pieces for the axles 2 and 4; a pusher, 6; a main body, 7; an auxiliary body or foot well, 8; a back, 9; a body bottom, 10; and supporting springs, as 11 and 12.

The pusher 6 may well be of the ordinary form and a continuation of the perch 5.

The springs 11 and 12 may well be of the ordinary form having one end of each rigidly attached, one to the front axle, 2, and the other to the rear axle, 4; and the other ends, one attached to the forward portion of the body, 10, the other to the rear portion of the body, 10.

The bottom, 10, is the portion which, in the main, substantially includes the new construction. In the construction preferred, in order to embody applicant's invention, the bottom, 10 has two side rails 13 and 14, as best seen in Fig. 3. These side rails are rigidly connected by the top plate 15, well shown in both Figs. 1 and 3. This top plate forms the bottom or seat of the carriage. The side rails 13 and 14 are also connected, at the front end by the under cross-bar, 16, and at the rear end by the under cross-bar 17. The side rails 13 and 14, the top plate 15 and the under cross-bars 16 and 17 form a strong rigid frame serving as the bottom 10 of the carriage.

Between the top plate 15 and the cross-bar 16 is positioned the foot well slide 18, well shown in Figs. 1 and 3. This foot well slide is movable forwardly and rearwardly sliding between the plate 15 and the cross-bar 16 and is provided with a shoulder, 19, to limit movement forwardly. An adjusted position of the foot well slide 18 may be retained by adjusting the thumb screw 20 which passes through the cross-bar 16 and in screw threaded engagement therewith so as to bear firmly against the slide 18, there being provided a metallic member 21 attached to cross-bar 16 for receiving the thumb screw 20 in screw threaded engagement.

At the forward end of the slide 18 a foot well 8 is pivotally attached, as at 22. By reason of this pivotal attachment, the foot well 8 may be positioned as shown in full lines in Fig. 1 or as shown in dotted lines, or any position between. In order to conveniently move the foot well 8 to its various positions there has been provided a link 23 which is pivotally attached, as at 24, to a T-member 25 attached to the foot well, 8. When link 23 is pushed forwardly the foot well 8 is raised. When link 23 is pulled rearwardly the foot well 8 is depressed. In order to retain an adjusted position of the link 23 and so of the foot well 8 the link 23 is provided with notches 26 which are positioned to engage an edge of a link rest 27 attached rigidly to cross-bar 17.

The side frames of the body 7 as 28 and 29 may well be of wicker work supported by rods as 30, 31, 32 and 33, the ends of which are held in the side rails 13 and 14 as illustrated at 34 in Fig. 1.

A child, while sitting in the carriage, even of some considerable size will find ample space for its body within the body of the carriage and for its feet and legs within the foot well 8. A child, when small, will find ample space within which to recline when the foot well 8 is moved up into the dotted line position as shown in Fig. 1 when the slide 18 is inwardly or rearwardly as far as it will go. As the child grows, more space will be needed for reclining. In such case the thumb screw 20 will be loosened and the slide 18 drawn forwardly such a distance as will allow provision for ample space for a reclining child when the well 8 is in the dotted line position and the adjusted position of the slide 18 will be retained by tightening the thumb screw 20.

Due to a general lack of storage space, especially in large cities, a carriage as small as possible is desired. At the same time, a carriage of sufficient size to be used for a baby during what might be called its entire carriage life, is desired. By employing a carriage embodying a slide, as 18, one may secure a small compact carriage suitable for the smallest child and requiring the minimum of storage space. As the child grows the carriage may be virtually expanded to provide for the increased size of the child and for ample space for the child while reclining.

In many cases it will be desirable to be able to expand the carriage in two directions thereby utilizing to the full the advantages of the invention. In such case the back, 9, of the carriage will be attached to a slide as 35 held between the top plate 15 and the crossbar 17 and provided with a shoulder 36. This slide may be moved backwardly and forwardly between the plate 15 and the crossbar 17 and held in adjusted position by a thumb screw 37. For a very small child either sitting or reclining the back, 9, and the slide 35 would be pushed forwardly as far as possible as shown in Fig. 1. For a larger child, especially while reclining, the slide 35 with the back 9 attached thereto would be moved rearwardly, by grasping back 9, to afford the necessary space for the child.

Although I have particularly described one physical embodiment of my invention and illustrated the construction and principle of operation thereof, nevertheless, I desire to have it understood that the form selected is merely illustrative, but does not exhaust the possible physical embodiment of means underlying my invention.

What I claim as new and desire to secure by Letters Patent of the United States, is:

1. In a baby carriage, a main body, a support slidable longitudinally of the body, a foot well pivotally secured to the forward end of said support, means to adjust the foot well to different angular positions, and means to retain said slidable support in different positions with respect to the body.

2. In a baby carriage, a main body, a pair of supports slidable longitudinally of the body in opposite directions, a foot well pivotally secured to the front end of the forwardly slidable support, a back member secured to the rear end of the rearwardly slidable support, and means for securing said supports in any desired adjusted positions.

HARRY BERMAN.